(12) United States Patent
Tanimura et al.

(10) Patent No.: US 6,482,323 B2
(45) Date of Patent: Nov. 19, 2002

(54) CHROMATOGRAPHIC SEPARATION PROCESS

(75) Inventors: Masakate Tanimura, Tokyo (JP); Manabu Ikemoto, Kanagawa (JP)

(73) Assignee: Nippon Rensui Co., Tokyo (JP)

( * ) Notice: Subject to any disclaimer, the term of this patent is extended or adjusted under 35 U.S.C. 154(b) by 22 days.

(21) Appl. No.: 09/843,892

(22) Filed: Apr. 30, 2001

(65) Prior Publication Data

US 2002/0088754 A1 Jul. 11, 2002

(30) Foreign Application Priority Data

Nov. 9, 2000 (JP) ........................ 2000-342618

(51) Int. Cl.$^7$ ............................................. B01D 15/08
(52) U.S. Cl. .................... 210/635; 210/659; 210/198.2; 127/46.2
(58) Field of Search ................. 210/635, 656, 210/659, 198.2; 127/46.1, 46.2, 46.3

(56) References Cited

U.S. PATENT DOCUMENTS

| 4,157,267 A | | 6/1979 | Odawara et al. ............ 210/659 |
| 4,599,115 A | * | 7/1986 | Ando ........................ 127/461 |
| 4,970,002 A | * | 11/1990 | Ando ........................ 210/659 |
| 5,064,539 A | * | 11/1991 | Tanimura .................... 210/659 |
| 5,122,275 A | | 6/1992 | Rasche ...................... 210/659 |
| 5,223,143 A | | 6/1993 | Masuda et al. ............. 210/659 |
| 5,556,546 A | * | 9/1996 | Tanimura .................... 210/659 |
| 6,063,285 A | * | 5/2000 | Hotier ....................... 210/659 |
| 6,096,218 A | * | 8/2000 | Hauck ....................... 210/659 |
| 6,280,623 B1 | * | 8/2001 | Ma ........................... 210/264 |

FOREIGN PATENT DOCUMENTS

| EP | 0 279 946 | 8/1988 | ................ 210/659 |
| JP | 6-170112 | 6/1994 | ................ 210/659 |

OTHER PUBLICATIONS

European Search Report dated Feb. 22, 2002, pp. 1 and 2.
Patent Abstract of Japan, 06–170112, Jun. 21, 1994.

* cited by examiner

*Primary Examiner*—Ernest G. Therkorn
(74) *Attorney, Agent, or Firm*—Sughrue Mion, PLLC

(57) ABSTRACT

A chromatographic separation process of a type wherein a feedstock fluid containing a plurality of components is supplied into a circulative chromatographic separation system, the process comprising the steps of (i) supplying the feedstock fluid and withdrawing a fraction enriched in a component, (ii) supplying a desorbent fluid and withdrawing a fraction enriched in another component, and (iii) circulating the fluid through the bed without supplying or withdrawing any fluid thereby making a mixed zone comprising a plurality of components move, a cycle including steps (i), (ii) and (iii) being repeated, wherein the packed bed comprises a first unit bed packed with an adsorbent, to which the feedstock fluid is supplied, and at least one other unit bed packed with an adsorbent, and the adsorbent (e.g., ion-exchange resin) packed into the first unit bed, to which the feedstock fluid is supplied, has a greater average particle size and/or a higher degree of crosslinking than that packed in the at least one other unit packed bed.

20 Claims, 4 Drawing Sheets

CHROMATOGRAPHIC SEPARATION PROCESS

BACKGROUND OF THE INVENTION

1. Field of the Invention

This invention relates to a process of chromatographic separation and, more particularly, to a process for chromatographically separating a fluid mixture comprising two or more components into two or more fractions enriched in the respective components.

2. Description of the Related Art

Chromatographic separation techniques using solid adsorbents are extensively conducted in industries. Various techniques of chromatographic separation have been proposed for separating a mixture of two or more components into fractions enriched in each component.

Among chromatographic separation systems is a simulated moving-bed system, which is widely used in industries for its excellent separation performance and high productivity. In this system a feedstock fluid or a desorbent is supplied to a packed bed at a constant flow rate, and the fluid flows through the packed bed also at a constant flow rate. The simulated moving-bed system, however, requires complicated apparatus and high skill of control on the supply of a feedstock fluid or a desorbent to the packed bed and on the movement of the fluid circulating through the packed bed. While the simulated moving-bed system shows excellent performance in separating a mixture into two fractions, great difficulty has been encountered with this system in achieving separation into three or more fractions.

Chromatographic separation processes, which can achieve satisfactory separation results with simpler apparatus, have been proposed as disclosed in JP-A-63-158105 (corresponding to U.S. Pat. No. 4,970,002 and Canadian Patent No. 1305434) and JP-A-2-49159. The process disclosed in JP-A-63-158105, for example, comprises repetition of cycles each including at least three steps; a step of supplying a feedstock fluid, a step of supplying a desorbent fluid, and a step of circulating the fluid in the packed bed.

In the simulated moving-bed system, the concentration distribution curves made in the packed bed macroscopically have almost the same form and circulatively move through the packed bed with time while keeping the form. Accordingly, the pressure required for moving the fluid through the packed bed, namely, the pressure drop (pressure loss) produced while the liquid moves from the upstream end to the downstream end of the packed bed may be seen substantially equal in any time zone. In this situation, the above-described process control relying on a constant flow rate is an effective system for controlling the apparatus with good reproducibility to obtain desired separation performance.

According to the method of JP-A-63-158105, the flow rate of the feedstock liquid and the desorbent fluid while being supplied and the flow rate of the liquid moving through the packed bed are controlled at a prescribed rate, and switches among the steps are made for a certain amount of the liquid or for a certain lapse of time. In this case, however, the concentrations of the individual components in the packed bed and the concentration distributions formed in the bed gradually vary with time in every step. More specifically, in the step wherein the feed stock fluid is supplied while a fraction enriched in a certain component is withdrawn, the concentration of the components present in the packed bed gradually increases from start to stop of the supply, and the feedstock is distributed in its maximum concentration in the packed bed to which it is supplied. In the step where the desorbent is supplied while a fraction enriched in another certain component is withdrawn, the concentration of the components present in the packed bed gradually decreases from start to stop of the supply. In other words, the feedstock supplied to the packed bed gradually decreases its concentration as it flows downstream. Even in the step where the fluid is moved circulatively with no liquid supplied nor withdrawn thereby to allow a zone in which a plurality of components are present in admixture to move to the upstream end of the packed bed, the concentration distribution in the packed bed gradually changes from start to stop of the step.

A mixture of saccharides (i.e., a carbohydrate solution including various kinds of sugars and/or sugar alcohols) is one of the most common feedstock fluid to be treated by chromatographic separation. In the present invention, the mixture of saccharides means a mixture solution of at least two selected from the group consisting of sugars and sugar alcohols. A mixture of saccharides greatly varies its viscosity depending on the concentration, and a higher concentration mixture has a higher viscosity. In treating such a fluid like a saccharides mixture as would greatly vary its viscosity according to the concentration, variations in concentrations of, or concentration distributions of, the components present in the packed bed necessitate variations of the pressure for moving the fluid through the bed at a constant rate. In other words, the pressure drop generated in moving the fluid in an upstream packed bed to which the feedstock fluid is supplied, being expressed in terms of pressure drop per unit height of the packed bed (hereinafter "unit pressure drop"), is different from that in a packed bed positioned downstream. That is, the packed bed to which the feedstock fluid is supplied shows a greater unit pressure drop than any other packed bed.

The changes in pressure drop are analyzed as follows. In the supply step in which a feedstock fluid containing a plurality of components is fed, a fluid having a lower concentration than the feedstock fluid and enriched in a certain component is withdrawn. Accordingly, the average concentration of the components in the bed gradually increases during this step. In the step of supplying the desorbent and withdrawing another fraction enriched in another certain component, the fluid withdrawn is obviously higher in concentration than the desorbent. This means that the average concentration of the components present in the packed bed is gradually decreasing in this desorption step. The feedstock fluid supplied moves through the packed bed with a descending unit pressure drop. In general, a maximum unit pressure drop is reached in the packed bed where the feedstock is supplied at about the end of the step of feeding the feedstock fluid.

Apparatus used in the above-described chromatographic separation processes including the simulated moving-bed system comprise a plurality of unit beds packed with an adsorbent selected according to the components to be separated. Cation-exchange resins have been in frequent use as an adsorbent. Because the purity or recovery of a component separated or recovered is greatly influenced by the properties of a chosen cation-exchange resin, various attempts have been made in making a choice of an adsorbent. For example, it has been proposed to use ion-exchangers having different ionic forms fit for the individual components or to use a combination of two or more kinds of adsorbents in separating a feedstock comprising three or more components into the individual fractions (see JP-A-11-183459 and JP-A-11-267404).

In order to improve separation efficiency of a chromatographic separation apparatus having a plurality of unit packed beds, it is generally preferred that every bed is packed with an ion-exchange resin having a small average particle size and/or a low degree of crosslinking. However, an adsorbent having a smaller particle size makes the unit pressure drop greater, and a resin having a lower degree of crosslinking has lower strength.

The method of JP-A-63-158105 supra employs an apparatus comprising a packed bed to which a feedstock fluid is supplied and other packed bed(s). As previously noted, where a feedstock fluid largely varies its viscosity with concentration as with the case of a saccharides mixture, the unit pressure drop reaches the maximum in the packed bed to which the feedstock fluid is supplied. The pressure applied to the fluid imposes a mechanical force on the adsorbent, i.e., an ion-exchange resin, as a friction pressure to substantively influence shape retention of the ion-exchange resin. In a worst case, the resin is ruptured by the force.

Where the ion-exchange resin of a packed bed to which a feedstock fluid is supplied has a small average particle size, the packed bed exhibits a large pressure drop factor (friction factor) to cause a high unit pressure drop. Further, an ion-exchange resin having a low degree of crosslinking has relatively low mechanical strength so that a pressure above a certain level tends to cause compaction. As a result, the pressure drop increases at an increasing rate, and rupture of the resin particles can result.

There is a trend to use ion-exchange resins of small particle size and low degree of crosslinking for obtaining desired separation performance. However, to use such ion-exchange resins, while making no particular problem in small-scale apparatus, will cause a great hindrance in securing desired separation performance with large apparatus of industrial scale for an extended period of time and is also economically problematic because of large energy required to move liquid (i.e., the high running cost).

The present inventors have confirmed that using an ion-exchange resin having an increased average particle size or an increased degree of crosslinking as an adsorbent to be packed into a separation column to which a feedstock fluid is supplied does not impair the separation performance of the whole separation system because the degree of separation in this packed bed is low.

SUMMARY OF THE INVENTION

An object of the present invention is to provide an improvement comprising using an adsorbent (especially an ion-exchange resin) having specific physical properties in a chromatographic separation process for separating a feedstock fluid comprising a plurality of components into fractions enriched in the individual components, the process involving variations in concentration and concentration distribution of the components of the feedstock fluid in the unit packed beds.

The concept of the present invention resides in controlling the relationship in physical properties between the adsorbent, e.g., an ion-exchange resin, which is used in a unit packed bed to which the feedstock fluid is supplied and the adsorbent which is used in the other unit packed bed(s).

The present invention provides a chromatographic separation process of a type wherein a feedstock fluid containing a plurality of components having different degrees of affinity for an adsorbent and a desorbent are alternately supplied into a chromatographic separation system in which the downstream end of a bed packed with the adsorbent is connected to its upstream end by a piping to enable the fluid to flow circulatively from the upstream end of the packed bed to its downstream end to form adsorption zones having the concentration distribution of the respective components and to withdraw therefrom a plurality of fractions different in components from the feedstock fluid, the process including the steps of:

(i) supplying the feedstock fluid into the packed bed at its upstream end while withdrawing a fraction enriched in a first component from the downstream end of the bed, (ii) supplying the desorbent fluid into the packed bed at its upstream end while withdrawing a fraction enriched in a second component from the downstream end of the bed, and (iii) circulating the fluid in the bed from the downstream end of the packed bed through the piping to its upstream end without supplying or withdrawing any fluid into or from the packed bed, thereby making a mixed zone where the first component withdrawn in step (i) and the second component are present in admixture move to the upstream end of the packed bed, the steps (i) to (iii) being performed cyclically and repeatedly, wherein;

the packed bed comprises a plurality of unit beds packed with an adsorbent, e.g., an ion-exchange resin, and the adsorbent packed into the unit bed to which the feedstock fluid is supplied has a greater average particle size than that packed in any other unit packed bed and/or has a higher degree of crosslinking than that packed in any other unit packed bed.

In a preferred embodiment of the invention, i) the adsorbent packed into the unit bed to which the feedstock fluid is supplied has a greater average particle size than that packed in any other unit packed bed, when the adsorbent packed into the unit bed to which the feedstock fluid is supplied has the same degree of crosslinking as that packed in any other unit packed bed, ii) the adsorbent packed into the unit bed to which the feedstock fluid is supplied has a higher degree of crosslinking than that packed in any other unit packed bed, when the adsorbent packed into the unit bed to which the feedstock fluid is supplied has the same average particle size as that packed in any other unit packed bed, or iii) the adsorbent packed into the unit bed to which the feedstock fluid is supplied has a greater average particle size than that packed in any other unit packed bed and has a higher degree of crosslinking than that packed in any other unit packed bed.

In a preferred embodiment of the invention, the adsorbent, e.g., an ion-exchanged resin, in the unit packed bed to which the feedstock fluid is supplied is 1.2 to 2.0 times as large as the adsorbent(s) in the other unit packed beds in average particle size. In another preferred embodiment of the invention, the volume of the adsorbent, e.g., an ion-exchange resin, in the unit packed bed to which the feedstock fluid is supplied is ⅛ to ½ of the total volume of the adsorbents of all the unit packed beds, and the adsorbent packed into the unit bed to which the feedstock fluid is supplied has a greater average particle size than that packed in any other unit packed bed and/or has a higher degree of crosslinking than that packed in any other unit packed bed. The chromatographic separation process of the invention is particularly fit for separating a mixture of saccharides (a carbohydrate solution).

BRIEF DESCRIPTION OF THE DRAWINGS

In FIGS. 4 and 5, the Y-axis and X-axis denote concentration of an individual component (%), and time (min.), respectively.

DETAILED DESCRIPTION OF THE INVENTION

The chromatographic separation process of the present invention is basically of the type taught in JP-A-63-158105, in which a feedstock fluid is fed intermittently, and components of the feedstock fluid are always present in the packed bed, which is carried out by repeating cycles each basically including the steps of:

(i) supplying the feedstock fluid into the packed bed at its upstream end while withdrawing a fraction enriched in an arbitrary component (a first component) from the downstream end of the bed (hereinafter referred to as a supply step), (ii) supplying a desorbent fluid into the packed bed at its upstream end while withdrawing a fraction enriched in another component (a second component) from the downstream end of the bed (hereinafter referred to as a desorption step) and (iii) circulating the fluid in the bed without supplying or withdrawing any fluid to or from the packed bed, thereby making a mixed zone where the first component withdrawn in step (i) and the second component are present in admixture move to the upstream end of the packed bed (hereinafter referred to as a circulation step).

Figure 1:
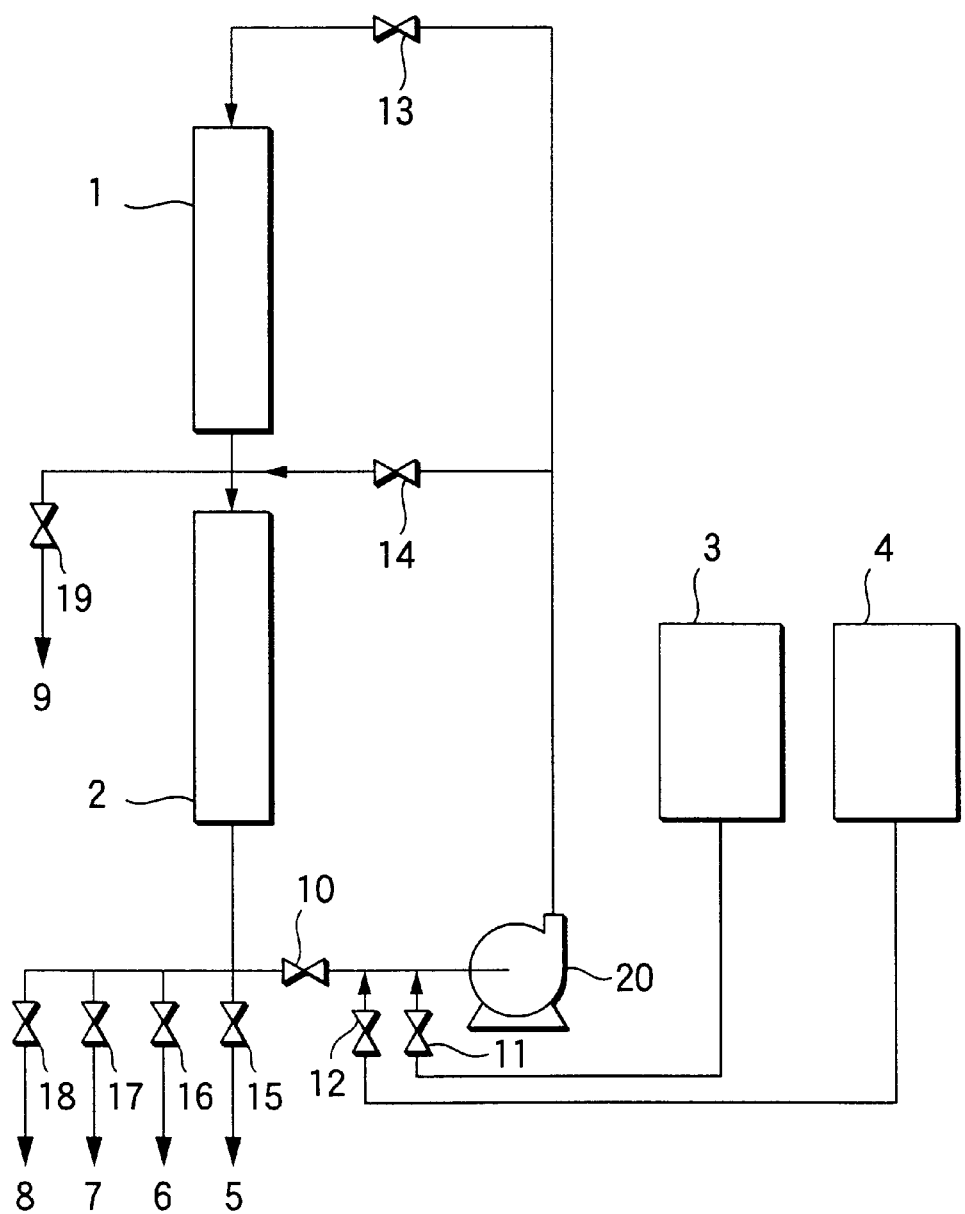
FIG. 1 is a schematic diagram of a chromatographic separation apparatus that can be used to carry out the process of the present invention.

The chromatographic separation process according to the present invention is carried out by repeating the cycle comprising at least steps (i) to (iii) and, if necessary, additional steps depending on the components contained in the feedstock fluid to be separated. The chromatographic separation apparatus which can be used to effect the process of the invention has a plurality of unit packed beds, i.e., a packed bed to which the feedstock fluid is supplied directly (hereinafter referred to as a feed bed) and at least one other unit packed bed. The adsorbent is decided according to the feedstock fluid to be treated and includes ion-exchange resins, silica gel, zeolite, activated carbon, ODS, and synthetic adsorbents. An example of the chromatographic separation apparatus is shown in FIG. 1. The apparatus shown comprises unit beds 1 and 2 packed with an adsorbent (these beds may have the same or different capacities or volumes of the adsorbent), a feedstock fluid tank 3, a desorbent fluid tank 4, and a circulating pump 20. Lines 5 to 9 are for withdrawal of resultant fractions, and valves 10 to 19 are ON-OFF valves for fluids and associated fractions.

In chromatographic separation with the apparatus of FIG. 1, the concentration and its distribution of each component in the packed bed change with time. In the supply step (the valves 11 and 13 are opened to feed the feedstock fluid from the tank 3 into the unit packed bed (i.e., feed bed) 1, and the valve 15 is opened to withdraw a fraction enriched in a certain component through the line 5), the concentration of the components in the unit packed beds gradually increases from beginning to end of the supply, and the feedstock is distributed in the highest concentration in the feed bed 1 at the end of this step. In the desorption step (the valves 12 and 13 are opened to supply a desorbent to the unit packed bed 1, and the valve 16 is opened to withdrawn a fraction enriched in another certain component through the line 6), the concentration of the components gradually decreases from beginning to end of the desorbent supply, reaching the minimum at the end of the desorption step. That is, the feedstock supplied to the feed bed gradually decreases its concentration as it flows downstream. In the circulation step (the valves 11 and 12 are closed, and the valves 10 and 13 are opened to circulate the fluid through the unit packed beds), the contents of the individual components throughout the whole system do not change, but the components are separated from each other as they move during the time from commencement to completion of the circulation, resulting in gradual changes of their concentration distribution. Including the supply step and the desorption step, the above-described chromatographic separation process develops a situation in which a zone where the components of the feedstock fluid are present in high concentrations moves downstream.

However, in cases where the feedstock fluid varies greatly in viscosity depending on its concentration like a mixture of saccharides, the fact that the concentration or the concentration distribution of the components present in a packed bed varies with time means that the pressure required for making the fluid move through the packed bed at a constant flow rate, namely, the unit pressure drop varies with time. It is the feed bed where the components of the mixture of saccharides are present in the highest concentration that shows the highest unit pressure drop.

In performing chromatographic separation by use of the apparatus shown in FIG. 1, it has been a conventional practice to pack all the units beds with an adsorbent of a kind, i.e., an ion-exchange resin and to use, as the ion-exchange resin, one having a relatively small average particle size and a low degree of crosslinking. However, where a feedstock fluid largely varies its viscosity with concentration as with the case of a saccharides mixture, the unit pressure drop reaches the maximum in the feed bed. The pressure applied to the fluid imposes a mechanical force on the adsorbent, i.e., an ion-exchange resin, as a friction pressure to substantively influence shape retention of the ion-exchange resin and impair the physical characteristics of the ion-exchange resin. In a worst case, the resin is fractured by the force.

Where the ion-exchange resin of a feed bed has a small average particle size, the bed exhibits a large pressure drop factor (friction factor) to have a high unit pressure drop. Further, an ion-exchange resin having a low degree of crosslinking has relatively low mechanical strength so that a pressure above a certain level tends to cause compaction. As a result, the pressure drop increases at an increasing rate, resulting in a failure to perform continuous operation in a stable manner for an extended period of time. In an extreme case, the system becomes incapable of circulating and/or moving the liquid.

According to the present invention, the above-described inconveniences caused by the high pressure associated with liquid circulation and/or movement are eliminated by controlling the balance of physical properties between the adsorbent (e.g., an ion-exchange resin) in the feed bed and that in the other unit packed bed(s). In the present invention it is necessary to pack the feed bed with an adsorbent (e.g., an ion-exchange resin) having a greater average particle size than that used in the other unit packed bed(s). By using the feed bed packed with an adsorbent (e.g., an ion-exchange resin) having an average particle size increased as far as the separation performance is not impaired, an increase in unit pressure drop required for liquid circulation and/or movement can be suppressed even if the liquid concentration in the feed bed increases. Namely, the force acting on the adsorbent (e.g., ion-exchange resin) particles in the feed bed is lessened, and the durability of the adsorbent is improved.

It is preferred that the average particle size of the adsorbent (e.g., ion-excahnge resin) in the feed bed is 1.2 to 2.0 times that of the adsorbent(s) in other unit packed beds. If the size difference between the adsorbent in the feed bed and the other adsorbent(s) is smaller than the above range, the resultant effects would be insubstantial. If the size difference exceeds the above range, the separation performance would be reduced as a whole.

The average particle size of an adsorbent (e.g., ion-exchange resin can) be obtained in a known manner. For example, the method of particle size distribution measurement described in DIAION®I (Second Edition Jun. 1, 1995), pp.139–141, Published by Mitsubishi Chemical Corp., Separation Materials Department can be followed.

The same effect can also be obtained by using a feed bed packed with an ion-exchange resin whose degree of crosslinking is higher than that of the ion-exchange resin(s) of the other unit packed beds. Since a resin having a high degree of crosslinking has high resistance against the high unit pressure drop produced by liquid circulation and/or movement, it is prevented from being compacted, and desired separation performance can be ensured. A degree of crosslinking of ion-exchange resins has influences on the separation performance, the strength, and the like. While various grades according to crosslinking degree are commercially available, the ion-exchange resin for use in the present invention is usually chosen from those having a crosslinking degree of about 4 to 10%. The adsorbent packed into the unit bed to which the feedstock fluid is supplied preferably has a higher degree of crosslinking than that packed in any other unit packed bed by at least 1%.

In the present invention, the degree of crosslinking (crosslinkage) of the ion-exchange resin is represented by the proportion of divinylbenzene (DVB) as a crosslinking agent (i.e., ((weight of DVB)/(weight of total monomers)× 100%)).

In order to reduce the unit pressure drop and to secure mechanical strength of the adsorbent, it is particularly preferred for the ion-exchange resin to be used in the invention to fulfill both the requirements of average particle size and degree of crosslinking.

In order to produce the desired separation performance, the volume of the adsorbent, e.g., an ion-exchange resin, in the feed bed is preferably ⅛ to ½ of the total volume of the adsorbents of all the unit packed beds constituting the separation system.

The ion-exchange resin which can be used as an adsorbent to be packed into separation columns include strongly acidic cation-exchange resins of alkali metal (e.g., Na or K) salt form or alkaline earth metal (e.g., Ca) salt form. For convenience, ion-exchange resins meeting the above-described requirements can be chosen from among commercially available products.

The process of the invention can be applied to various mixtures which comprise a plurality of components and separable into components by chromatographic separation technique. Typical applicable mixtures include mixtures of various saccharides (e.g., sugars and/or sugar alcohols). For example, the process is applicable to separation of fructose from high fructose corn syrup, separation of oligosaccharides from high fructose corn syrup, separation of sucrose from molasses, separation of a starch hydrolyzate containing maltose, maltodextrin, etc. into the individual components, separation of an inuline hydrolyzate containing fructose, inulo-biose, etc. into the individual components, separation of a mixture containing isomaltose and isomaltose dextrin into the individual components, and separation of a mixture containing sugar alcohols, such as sorbitol and maltitol, into the individual components.

The present invention is applicable to a separation process comprising the basic steps (i) to (iii) described in JP-A-63-158105 and an additional step(s) which is added in conformity to the feedstock liquid to be treated and the separation conditions. Specific examples of the chromatographic separation processes to which the present invention is applicable include:

(1) A chromatographic separation process of a type wherein a feedstock fluid containing a plurality of components having different degrees of affinity for an adsorbent and a desorbent fluid are alternately supplied into a chromatographic separation system in which the downstream end of a bed packed with the adsorbent is connected to its upstream end by a piping to enable the fluid to flow circulatively from the upstream end of the packed bed to its downstream end to form adsorption zones having the concentration distribution of the respective components and to withdraw therefrom a plurality of fractions different in components from the feedstock fluid, the process including the steps of:

(i) supplying the feedstock fluid into the packed bed at its upstream end while withdrawing a fraction enriched in a component having a higher degree of affinity to the adsorbent from the downstream end of the bed, (ii) supplying the desorbent fluid into the packed bed at its upstream end while withdrawing a fraction enriched in a component having a lower degree of affinity from the downstream end of the bed, and (iii) circulating the fluid in the bed from the downstream end of the packed bed through the piping to its upstream end without supplying or withdrawing any fluid into or from the packed bed, thereby making a mixed zone in which the component having higher affinity to the adsorbent and the component having lower affinity to the adsorbent are present in admixture move to the upstream end of the packed bed, the steps (i) to (iii) being performed cyclically and repeatedly to separate the feedstock fluid into two fractions.

(2) A chromatographic separation process of the type described in (1) above, which includes the steps of:

(i) supplying the feedstock fluid into the packed bed at its upstream end while withdrawing a fraction enriched in a component having a higher degree of affinity for the adsorbent from the downstream end of the bed, (ii) supplying the desorbent fluid into the packed bed at its upstream end while withdrawing a fraction enriched in the component having a higher degree of affinity for the adsorbent from the downstream end of the bed, (iii) supplying the desorbent fluid into the packed bed at its upstream end while withdrawing a fraction enriched in a component having a lower degree of affinity for the adsorbent from the downstream end of the bed, and (iv) circulating the fluid in the bed from the downstream end of the packed bed through the piping to its upstream end without supplying or withdrawing any fluid to or from the packed bed, thereby making a mixed zone where the component having a higher degree of affinity for the adsorbent and the component having a lower degree of affinity for the adsorbent are present in admixture move to the upstream end of the packed bed, the steps (i) to (iv) being performed cyclically and repeatedly to separate the feedstock fluid into two fractions.

(3) A chromatographic separation process of the type described in (1) above, which includes the steps of:
  (i) supplying the feedstock fluid into the packed bed at its upstream end while withdrawing a fraction enriched in a component having a higher degree of affinity for the adsorbent from the downstream end of the bed,
  (ii) supplying the desorbent fluid into the packed bed at the middle of the packed bed while withdrawing a fraction enriched in the component having a higher degree of affinity for the adsorbent from the downstream end of the bed,
  (iii) circulating the fluid in the bed from the downstream end of the packed bed through the piping to its upstream end without supplying or withdrawing any fluid to or from the packed bed, thereby making a mixed zone where the component having a higher degree of affinity for the adsorbent and a component having a lower degree of affinity for the adsorbent are present in admixture move to the upstream end of the packed bed,
  (iv) supplying the desorbent fluid into the packed bed at its upstream end while withdrawing a fraction enriched in the component having a lower degree of affinity for the adsorbent from the downstream end of the bed, and
  (v) circulating the fluid in the bed without supplying or withdrawing any fluid to or from the packed bed, thereby making a mixed zone where the component having a higher degree of affinity for the adsorbent and the component having a lower degree of affinity for the adsorbent are present in admixture move to the upstream end of the packed bed, the steps (i) to (v) being performed cyclically and repeatedly to separate the feedstock fluid into two fractions.

(4) A chromatographic separation process of the type described in (1) above, which includes the steps of:
  (i) supplying the feedstock fluid into the packed bed at its upstream end while withdrawing a fraction enriched in a component having a lower degree of affinity for the adsorbent from the downstream end of the bed,
  (ii) circulating the fluid in the bed from the downstream end of the packed bed through the piping to its upstream end without supplying or withdrawing any fluid to or from the packed bed, thereby making a mixed zone wherein a component having a higher degree of affinity for the adsorbent and the component having a lower degree of affinity for the adsorbent are present in admixture move to the upstream end of the packed bed, and
  (iii) supplying the desorbent fluid into the packed bed at its upstream end while withdrawing a fraction enriched in the component having a higher degree of affinity for the adsorbent from the downstream end of the bed, the steps (i), (ii) and (iii) being performed cyclically and repeatedly to separate the feedstock fluid into two fractions.

(5) A chromatographic separation process of the type described in (1) above, which includes the steps of:
  (i) supplying the feedstock fluid into the packed bed at its upstream end while withdrawing a fraction enriched in a component having the second highest degree of affinity for the adsorbent from the downstream end of the bed,
  (ii) circulating the fluid in the bed from the downstream end of the packed bed through the piping to its upstream end without supplying or withdrawing any fluid to or from the packed bed, thereby making a mixed zone wherein the component having the second highest degree of affinity and a component having the highest degree of affinity for the adsorbent are present in admixture move to the upstream end of the packed bed,
  (iii) supplying the desorbent fluid into the packed bed at the upstream end of the packed bed while withdrawing a fraction enriched in the component having the highest degree of affinity for the adsorbent from the downstream end of the bed,
  (iv) supplying the desorbent fluid into the packed bed at the upstream end of the packed bed while withdrawing a fraction enriched in a component having the lowest degree of affinity for the adsorbent from the downstream end of the bed, and
  (v) circulating the fluid in the bed from the downstream end of the packed bed through the piping to its upstream end without supplying or withdrawing any fluid to or from the packed bed, thereby making a mixed zone wherein the component having the second highest degree of affinity for the adsorbent and the component having the lowest degree of affinity for the adsorbent are present in admixture move to the upstream end of the packed bed, the steps (i) to (v) being performed cyclically and repeatedly to separate the feedstock fluid into three fractions.

(6) A chromatographic separation process of the type described in (1) above, which includes the steps of:
  (i) supplying the feedstock fluid into the packed bed at its upstream end while withdrawing a fraction enriched in a component having the second highest degree of affinity for the adsorbent from the downstream end of the bed,
  (ii) supplying the desorbent fluid into the packed bed at the middle of the packed bed while withdrawing a fraction enriched in the component having the second highest degree of affinity for the adsorbent from the downstream end of the bed,
  (iii) circulating the fluid in the bed from the downstream end of the packed bed through the piping to its upstream end without supplying or withdrawing any fluid to or from the packed bed, thereby making a mixed zone where the component having the second highest degree of affinity for the adsorbent and a component having the highest degree of affinity for the adsorbent are present in admixture move to the upstream end of the packed bed,
  (iv) supplying the desorbent fluid into the packed bed at the upstream end of the packed bed while withdrawing a fraction enriched in the component having the highest degree of affinity for the adsorbent from the downstream end of the bed,
  (v) supplying the desorbent fluid into the packed bed at the upstreamend of the packed bed while withdrawing a fraction enriched in a component having the lowest degree of affinity for the adsorbent from the downstream end of the bed, and (vi) circulating the fluid in the bed without supplying or withdrawing any fluid to or from the packed bed, thereby making a mixed zone where the component having the second highest degree of affinity for the adsorbent and the component having the lowest degree of affinity for the adsorbent are present in admixture move to the upstream end of the packed bed, the steps (i) to (vi) being performed cyclically and repeatedly to separate the feedstock fluid into three fractions.

(7) A chromatographic separation process of the type described in (1) above, which includes the steps of:

(i) supplying the feedstock fluid into the packed bed at its upstream end while withdrawing a fraction enriched in a component having the second highest degree of affinity for the adsorbent from the downstream end of the bed, (ii) supplying an additional amount of the feedstock fluid into the packed bed at its upstream end while withdrawing a fraction enriched in a component having the lowest degree of affinity for the adsorbent from the middle of the packed bed, (iii) circulating the fluid in the bed from the downstream end of the packed bed through the piping to its upstream end without supplying or withdrawing any fluid to or from the packed bed, thereby making a mixed zone wherein the component having the second highest degree of affinity for the adsorbent and the component having the highest degree of affinity for the adsorbent are present in admixture move to the upstream end of the packed bed, (iv) supplying the desorbent fluid into the packed bed at the upstream end of the packed bed while withdrawing a fraction enriched in a component having the highest degree of affinity for the adsorbent from the downstream end of the bed, (v) supplying an additional amount of the desorbent fluid into the packed bed at the upstream end of the packed bed while withdrawing a fraction enriched in the component having the lowest degree of affinity for the adsorbent from the downstream end of the bed, and (vi) circulating the fluid in the bed without supplying or withdrawing any fluid to or from the packed bed, thereby making a mixed zone where the component having the second highest degree of affinity for the adsorbent and the component having the lowest degree of affinity for the adsorbent move to the upstream end of the packed bed, the steps (i) to (vi) being performed cyclically and repeatedly to separate the feedstock fluid into three fractions.

(8) A chromatographic separation process of the type described in (1) above, which includes the steps of:

(i) supplying the feedstock fluid into the packed bed at its upstream end while withdrawing a fraction enriched in a component having the second highest degree of affinity for the adsorbent from the downstream end of the bed, (ii) supplying the desorbent fluid into the packed bed at the middle of the packed bed while withdrawing a fraction enriched in the component having the second highest degree of affinity for the adsorbent from the downstream end of the bed, (iii) circulating the fluid in the bed from the downstream end of the packed bed through the piping to its upstream end without supplying or withdrawing any fluid to or from the packed bed, thereby making a mixed zone where the component having the second highest degree of affinity for the adsorbent and a component having the highest degree of affinity for the adsorbent are present in admixture move to the upstream end of the packed bed, (iv) supplying the desorbent fluid into the packed bed at the upstream end of the packed bed while withdrawing a fraction enriched in the component having the highest degree of affinity for the adsorbent from the downstream end of the bed, (v) supplying an additional amount of the desorbent fluid into the packed bed at the upstream end of the packed bed while withdrawing a fraction enriched in a component having the lowest degree of affinity for the adsorbent from the downstream end of the bed, (vi) supplying an additional amount of the desorbent fluid into the packed bed at the upstream end of the packed bed while withdrawing a fraction enriched in a component having the third highest degree of affinity for the adsorbent from the downstream end of the bed, and (vii) circulating the fluid in the bed from the downstream end of the packed bed through the piping to its upstream end without supplying or withdrawing any fluid to or from the packed bed, thereby making a mixed zone where the component having the second highest degree of affinity for the adsorbent and the component having the third highest degree of affinity for the adsorbent are present in admixture move to the upstream end of the packed bed, the steps (i) to (vii) being performed cyclically and repeatedly to separate the feedstock fluid into four fractions.

The present invention is applicable, as a matter of course, to chromatographic separation processes comprising repetition of cycles each made up of the steps of: supplying a feedstock fluid only in a limited period of time while withdrawing a fraction enriched in a certain component, supplying a desorbent to withdraw a fraction enriched in a certain component in another period of time, and circulating the fluid, as described in JP-A-62-91205, JP-A-1-80409, JP-A-4-227804, JP-A-334503, JP-A-4-367701, JP-A-11-267404, JP-A-11-183459, JP-A-4-363102, etc.

The present invention will now be illustrated in greater detail with reference to Examples, but it should be understood that the invention is not construed as being limited thereto.

EXAMPLE 1

Figure 2:
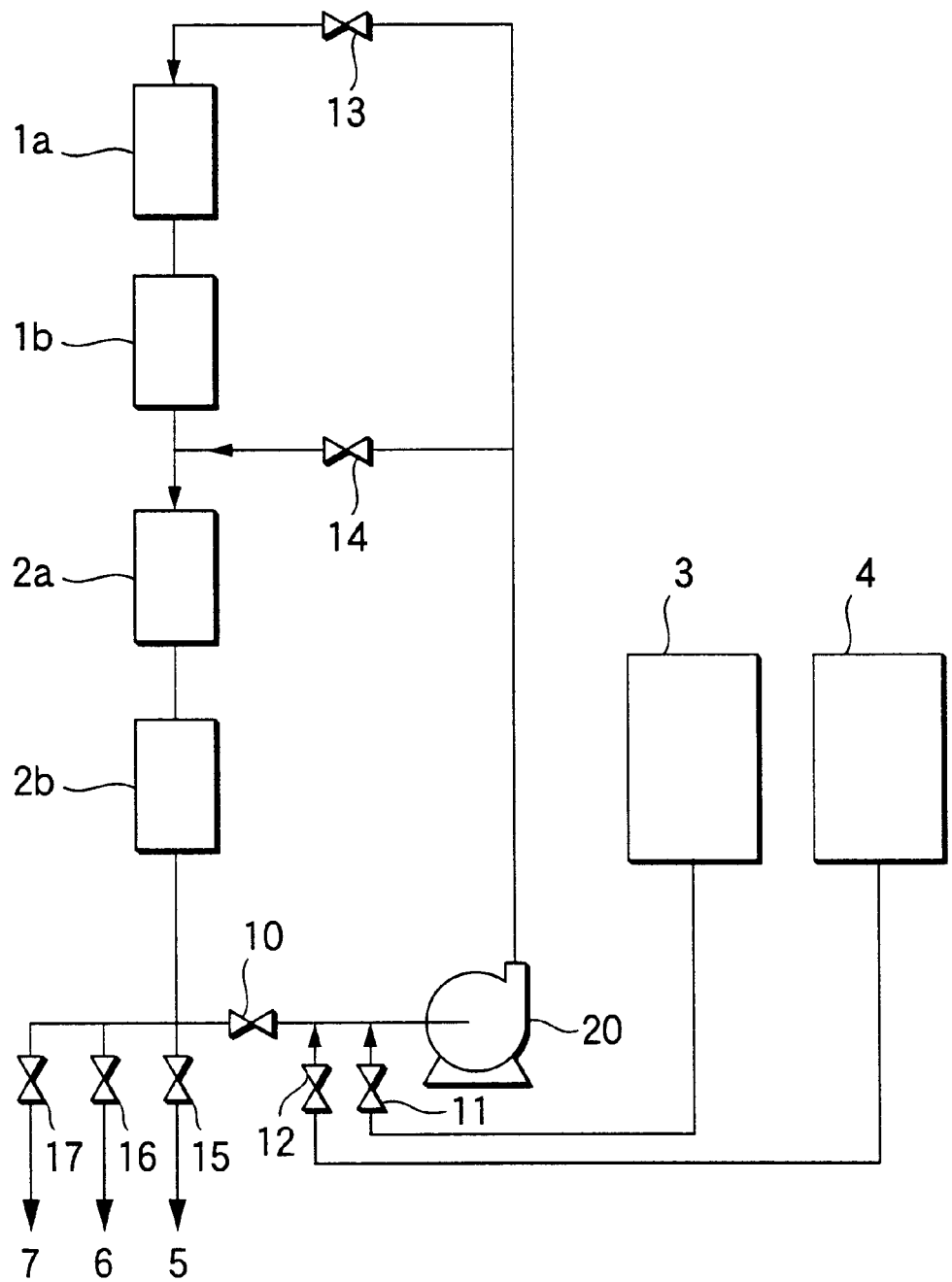
FIGS. 2 and 3 are schematic diagrams of the chromatographic separation apparatus used in Examples 1 and 2, respectively.

A feedstock fluid (a mixture of sugar alcohols), whose composition is shown in Table 1, was subjected to chromatographic separation by use of an apparatus of the type shown in FIG. 2.

The apparatus was composed of four separation columns 1a, 1b, 2a, and 2b connected in series each having an inner diameter of about 43 mm and a bed height of 410 mm. The column 1a was packed to its full height with a strongly acidic cation-exchange resin of Ca salt form having an average particle size of 0.36 mm (360 $\mu$m) and a degree of crosslinking of 6% (DIAION® UBK-535KN, available from Mitsubishi Chemical Corp.), and the columns 1b, 2a and 2b were packed to their full height with a strongly acidic cation-exchange resin of Ca salt form having an average particle size of 0.22 mm (220 $\mu$m) and a degree of crosslinking of 6% (DIAION® UBK-535, available from Mitsubishi Chemical Corp.). Water was used as a desorbent. All the packed beds were maintained at 80° C. The feedstock fluid and water were treated through the unit packed beds at a volumetric flow rate of 1200 ml/hr to effect cyclic operations of chromatographic separation according to the time schedule shown in Table 2 below.

Figure 4:
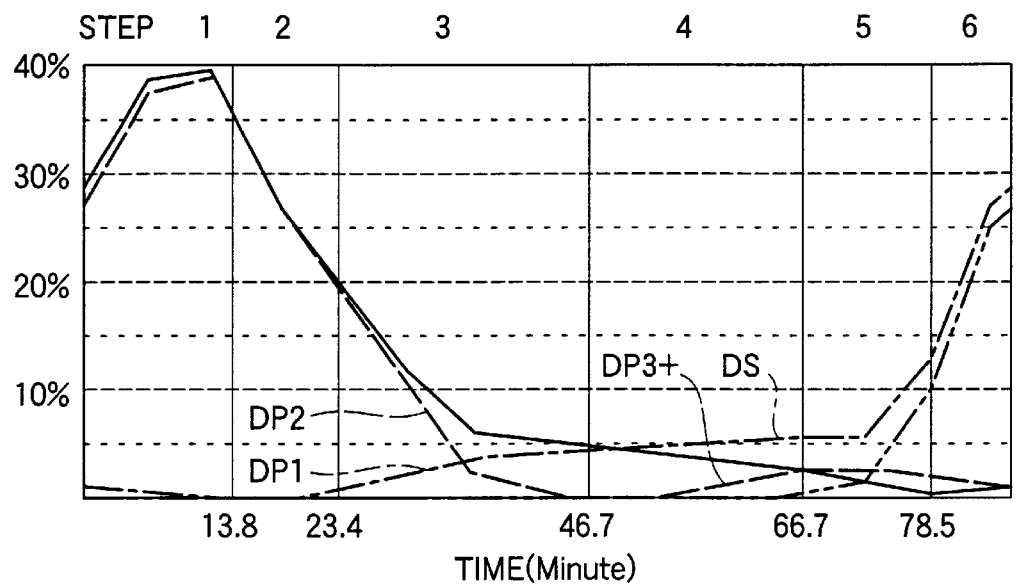
FIGS. 4 and 5 are concentration distributions of individual components flown out from the packed bed in Example 1 and Comparative Example 1, respectively.

Upon completion of 15 cycles, a steady state was reached. The concentration distributions obtained in the steady state are shown in FIG. 4, in which the Y-axis and X-axis denote concentration of an individual component (%), and time (min.), respectively.

The composition of each fraction and the recovery of the respective components are shown in Table 1 below.

TABLE 1

| | Composition (wt %) | | | |
|---|---|---|---|---|
| | Feedstock | Fraction DP1 | Fraction DP2 | Fraction DP3+ |
| DP1 | 8.8 | 71.8 | 1.3 | 19.6 |
| DP2 | 84.4 | 4.2 | 97.0 | 35.7 |
| DP3+ | 6.8 | 24.0 | 1.6 | 44.7 |
| Concentration (%) | 60.0 | 4.5 | 33.2 | 6.6 |
| Recovery (%) | | 70.4 | 96.4 | 51.8 |

TABLE 2

| Step | Supplied Fluid | Withdrawn Fluid | Valves Opened | Flow (ml) |
|---|---|---|---|---|
| 1 | feedstock | fraction DP2 | 11, 13, 16 | 276.0 |
| 2 | water | fraction DP2 | 12, 14, 16 | 192.0 |
| 3 | — | — | 10, 13 | 456.0 |
| 4 | water | fraction DP1 | 12, 13, 15 | 400.0 |
| 5 | water | fraction DP3+ | 12, 13, 17 | 236.0 |
| 6 | — | — | 10, 13 | 150.0 |

The above results were applied to a scaled-up plant using four separation columns of 3,300 mm in inner diameter and 1,750 mm in height to calculate the pressure drop of each packed bed. The results obtained are shown in Table 3 below.

TABLE 3

| | Feed Bed (1a) | Other unit Beds (1b + 2a + 2b) | Total of 4 Unit Beds |
|---|---|---|---|
| Pressure drop ($\Delta P$) at End of Supply Step (kg/cm$^2$) | 1.26 | 1.69 | 2.95 |

COMPARATIVE EXAMPLE 1

A feedstock fluid (an aqueous solution of sugar alcohols), whose composition is shown in Table 4 below, was subjected to chromatographic separation by use of an apparatus of the type shown in FIG. 2.

Figure 5:
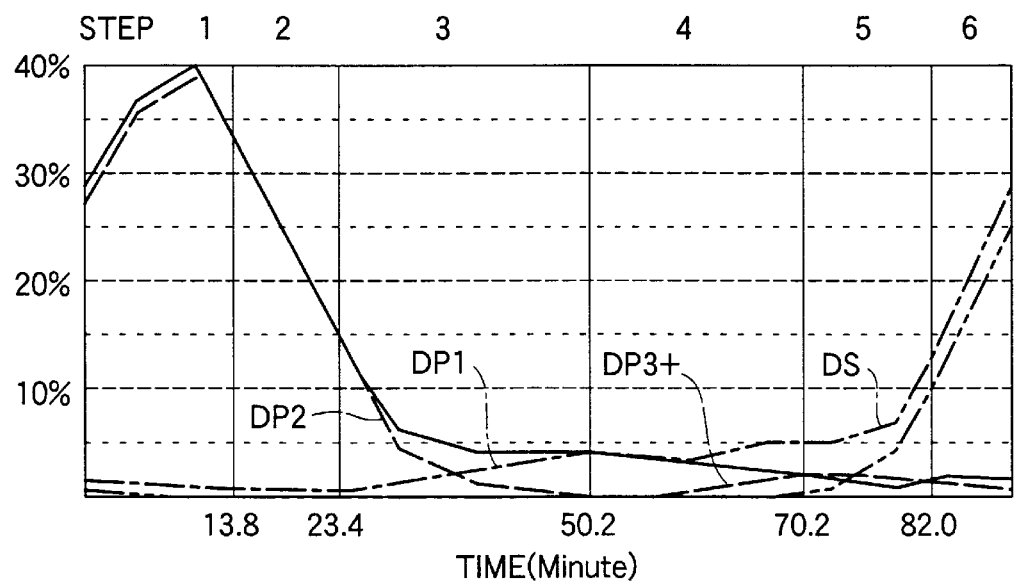

The apparatus was composed of four separation columns 1a, 1b, 2a, and 2b connected in series each having an inner diameter of about 27.3 mm and a height of 550 mm. All the columns were each packed to their full height (550 mm) with a strongly acidic cation-exchange resin of Ca salt form having an average particle size of 0.22 mm (220 μm) and a degree of crosslinking of 6% (DIAION® UBK-535, available from Mitsubishi Chemical Corp.). Water was used as a desorbent. All of the unit packed beds were maintained at 80° C. The feedstock fluid was treated through the unit packed beds at a volumetric flow rate of 600 ml/hr to effect cyclic operations of chromatographic separation according to the time schedule shown in Table 5 below. Upon completion of 15 cycles, a steady state was reached. The concentration distributions obtained in the steady state are shown in FIG. 5, in which the X-axis and the Y-axis have the same meaning as in FIG. 4. The composition of each fraction and the recovery of the respective components are shown in Table 4 below.

TABLE 4

| | Composition (wt %) | | | |
|---|---|---|---|---|
| | Feedstock | Fraction DP1 | Fraction DP2 | Fraction DP3+ |
| DP1 | 8.3 | 65.4 | 1.2 | 22.2 |
| DP2 | 85.0 | 6.8 | 97.4 | 35.0 |
| DP3+ | 6.7 | 27.8 | 1.4 | 42.8 |
| Concentration (%) | 60.0 | 4.5 | 33.3 | 6.2 |
| Recovery (%) | | 69.0 | 96.0 | 50.0 |

TABLE 5

| Step | Supplied Fluid | Withdrawn Fluid | Valves Opened | Flow (ml) |
|---|---|---|---|---|
| 1 | feedstock | fraction DP2 | 11, 13, 16 | 138.0 |
| 2 | water | fraction DP2 | 12, 14, 16 | 96.0 |
| 3 | — | — | 10, 13 | 268.0 |
| 4 | water | fraction DP1 | 12, 13, 15 | 200.0 |
| 5 | water | fraction DP3+ | 12, 13, 17 | 118.0 |
| 6 | — | — | 10, 13 | 75.0 |

The above results were applied to a scaled-up plant using four separation columns of 3,300 mm in inner diameter and 1,750 mm in height to calculate the pressure drop in each packed bed. The results obtained are shown in Table 6 below.

TABLE 6

| | Feed Bed (1a) | Other Unit Beds (1b + 2a + 2b) | Total of 4 Unit Beds |
|---|---|---|---|
| Pressure drop ($\Delta P$) at End of Supply Step (kg/cm$^2$) | 3.38 | 1.69 | 5.06 |

EXAMPLE 2

Figure 3:
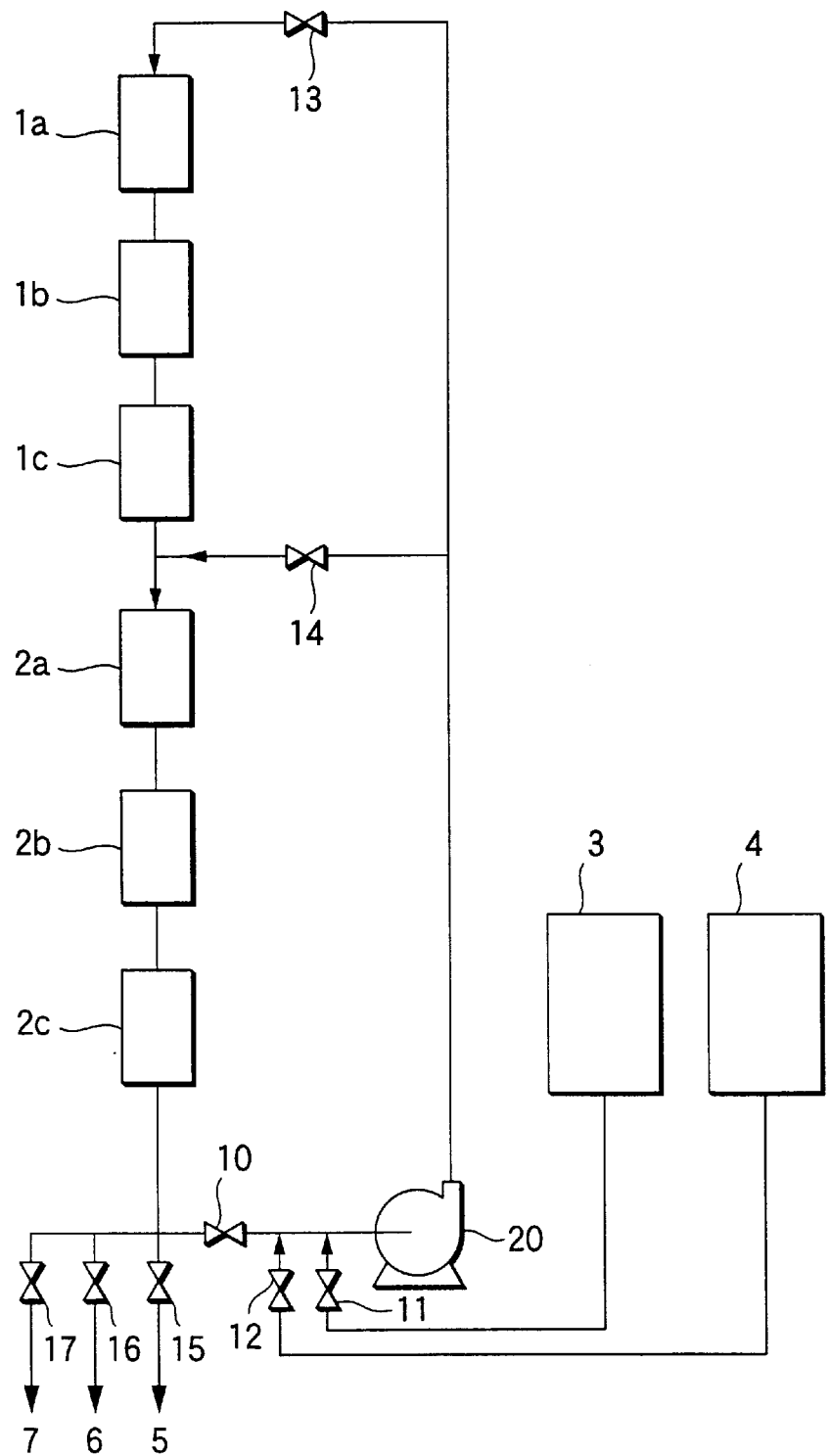

A feedstock fluid (a mixture of saccharides) having the composition shown in Table 7 below was subjected to chromatographic separation by use of an apparatus of the type shown in FIG. 3.

The apparatus was composed of six separation columns 1a, 1b, 1c, 2a, 2b, and 2c connected in series each having an inner diameter of about 30 mm and a height of 410 mm (total packed bed height: 2,460 mm). The column 1a was packed to its full height with a strongly acidic cation-exchange resin of Na salt form having an average particle size of 0.36 mm (360 μm) and a degree of crosslinking of 6% (DIAION® UBK-530KN, available from Mitsubishi Chemical Corp.), and the columns 1b, 1c, 2a, 2b, and 2c were packed to their full height with a strongly acidic cation-exchange resin of Na salt form having an average particle size of 0.3 mm (300 μm) and a degree of crosslinking of 5% (DIAION® UBK-520M, available from Mitsubishi Chemical Corp.). Water was used as a desorbent. All of the unit packed beds were maintained at 80° C. The feedstock fluid was treated through the unit packed beds at a volumetric flow rate of 600 ml/hr to effect cyclic operations of chromatographic separation according to the time schedule shown in Table 8 below.

The composition of each fraction and the recovery of the respective components obtained in the 15th cycle where a steady state was reached are shown in Table 7 below.

TABLE 7

| | Composition (wt %) | | | |
|---|---|---|---|---|
| | Feedstock | Fraction DP1 | Fraction DP2 | Fraction DP3+ |
| DP1 | 42.0 | 81.0 | 0.5 | 7.2 |
| DP2A | 9.0 | 8.1 | 10.6 | 0.0 |
| DP2B | 45.5 | 11.0 | 86.5 | 9.4 |
| DP3+ | 3.5 | 0.0 | 2.3 | 83.3 |
| Concentration (%) | 65.0 | 16.5 | 26.3 | 1.0 |
| Recovery (%) | | 99.0 | 87.0 | 69.0 |

TABLE 8

| Step | Supplied Fluid | Withdrawn Fluid | Valves Opened | Flow (ml) |
|---|---|---|---|---|
| 1 | feedstock | fraction DP2B | 11, 13, 16 | 115.0 |
| 2 | water | fraction DP2B | 12, 14, 16 | 40.0 |
| 3 | — | — | 10, 13 | 140.0 |
| 4 | water | fraction DP1 | 12, 13, 15 | 290.0 |
| 5 | water | fraction DP3+ | 12, 13, 17 | 280.0 |
| 6 | — | — | 10, 13 | 70.0 |

The above results were applied to a scaled-up plant using six separation columns of 2,200 mm in inner diameter and 1,300 mm in height to calculate the pressure drop in each packed bed. The results obtained are shown in Table 9 below.

TABLE 9

| | Feed Bed (1a) | Other Unit Beds (1b + 1c + 2a + 2b + 2c) | Total of 6 Unit Beds |
|---|---|---|---|
| Pressure drop ($\Delta P$) at End of Supply Step (kg/cm$^2$) | 2.37 | 1.81 | 4.18 |

COMPARATIVE EXAMPLE 2

A feedstock fluid (a mixture of sugar alcohols), whose composition is shown in Table 10 below, was subjected to chromatographic separation by use of the same apparatus as used in Example 2. All the columns were each packed to their full height (410 mm) with a strongly acidic cation-exchange resin of Na salt form having an average particle size of 300 μm and a degree of crosslinking of 5% (DIAION® UBK-520M, available from Mitsubishi Chemical Corp.). The total length of the unit packed beds was 2,460 mm. Water was used as a desorbent. All of the unit packed beds were maintained at 80° C. The feedstock fluid was treated through the unit packed beds to effect cyclic operations of chromatographic separation according to the time schedule shown in Table 11 below. The composition of each fraction and the recovery of the respective components obtained in the steady state (15th cycle), are shown in Table 10.

TABLE 10

| | Composition (wt %) | | | |
|---|---|---|---|---|
| | Feedstock | Fraction DP1 | Fraction DP2 | Fraction DP3+ |
| DP1 | 41.0 | 83.4 | 0.9 | 0.8 |
| DP2A | 8.5 | 6.8 | 9.2 | 2.8 |
| DP2B | 48.2 | 9.8 | 87.4 | 54.3 |
| DP3+ | 2.3 | 0.0 | 2.5 | 42.1 |
| Concentration (%) | 65.0 | 15.7 | 19.6 | 1.3 |
| Recovery (%) | | 98.9 | 85.1 | 57.4 |

TABLE 11

| Step | Supplied Fluid | Withdrawn Fluid | Valves Opened | Amount of Supplied Fluid (ml) |
|---|---|---|---|---|
| 1 | feedstock | fraction DP2B | 11, 13, 16 | 115.0 |
| 2 | water | fraction DP2B | 12, 14, 16 | 90.0 |
| 3 | — | — | 10, 13 | 130.0 |
| 4 | water | fraction DP1 | 12, 13, 15 | 290.0 |
| 5 | water | fraction DP3+ | 12, 13, 17 | 270.0 |
| 6 | — | — | 10, 13 | 70.0 |

The above results were applied to a scaled-up plant using six separation columns of 2,200 mm in inner diameter and 1,300 mm in height to calculate the pressure drop in each packed bed. The results obtained are shown in Table 12 below.

TABLE 12

| | Feed Bed (1a) | Other Unit Beds (1b + 1c + 2a + 2b + 2c) | Total of 6 Unit Beds |
|---|---|---|---|
| Pressure drop ($\Delta P$) at End of Supply Step (kg/cm$^2$) | 3.39 | 1.81 | 5.20 |

Although Comparative Example 2, in which an ion-exchange resin having a small particle size is used, achieves substantially the same separation performance as in Example 2 in terms of purity and recovery of DP2B fraction, shows an extremely high pressure drop ($\Delta P$), which is an operational disadvantage.

The present invention makes it possible to prolong the working life of the adsorbent and to prevent compaction of the adsorbent, thereby preventing an increase of pressure drop without being accompanied by reduction in separation performance. As a result, the operating cost including the pumping power can be reduced. The effects of the invention enable minimizing the designed pressure of separation columns, which leads to a reduction in plant investment.

The entire disclosure of each and every foreign patent application from which the benefit of foreign priority has been claimed in the present application is incorporated herein by reference, as if fully set forth.

What is claimed is:
1. A chromatographic separation process of a type wherein a feedstock fluid containing a plurality of components having different degrees of affinity for an adsorbent are supplied into a chromatographic separation system, in which the downstream end of a bed packed with the adsorbent is connected to its upstream end by a piping to enable the fluid to flow circulatively from the upstream end of the packed bed to its downstream end to form adsorption zones having concentration distributions of the respective components in the packed bed and then to get two or more fractions enriched by the respective components, the process comprising the steps of:

(i) supplying the feedstock fluid into the packed bed at its upstream end while withdrawing a fraction enriched in a first component from the downstream end of the bed, (ii) supplying a desorbent fluid into the packed bed at its upstream end while withdrawing a fraction enriched in a second component from the downstream end of the bed, and (iii) circulating the fluid in the packed bed from the downstream end of the bed through the piping to its upstream end without supplying or withdrawing any fluid into or from the packed bed, thereby making a mixed zone where the first component withdrawn in step (i) and the second component are present in admixture move to the upstream end of the packed bed, the steps (i) to (iii) being performed cyclically and repeatedly, wherein the packed bed comprises a first unit bed packed with an adsorbent, to which the feedstock fluid is supplied, and at least one other unit bed packed with an adsorbent, and the adsorbent packed into the first unit bed, to which the feedstock fluid is supplied, has a greater average particle size than that packed in the at least one other unit packed bed.

2. A chromatographic separation process as claimed in claim 1, wherein the average particle size of the adsorbent in the first unit packed bed, to which the feedstock fluid is supplied, is 1.2 to 2.0 times greater than that in the at least other unit packed bed.

3. A chromatographic separation process as claimed in claim 1, wherein the adsorbent in the first unit packed bed and the at least one other unit packed bed is an ion-exchange resin.

4. A chromatographic separation process as claimed in claim 1, wherein the absorbent packed in the first unit packed bed and the at least one other unit packed bed is a cation-exchange resin, the average particle size of the cation-exchange resin packed in the first unit bed, to which the feedstock fluid is supplied, is 1.2 to 2.0 times greater than that in the at least one other unit bed, and the degree of crosslinking of the cation-exchang resin packed in the first unit bed, to which the feedstock fluid is supplied, is higher than that in the at least one other unit bed.

5. A chromatographic separation process as claimed in claim 1, wherein the feedstock fluid is a mixture of at least two selected from the group consisting of sugars and sugar alcohols.

6. The chromatographic separation process according to claim 1, which is used for separating into two fractions.

7. The chromatographic separation process according to claim 1, which is used for separating into three fractions.

8. The chromatographic separation process according to claim 1, which is used for separating into four fractions.

9. A chromatographic separation process of a type wherein a feedstock fluid containing a plurality of components having different degrees of affinity for an adsorbent are supplied into a chromatographic separation system in which the downstream end of a bed packed with the adsorbent is connected to its upstream end by a piping to enable the fluid to flow circulatively from the upstream end of the packed bed to its downstream end to form adsorption zones having concentration distributions of the respective components in the packed bed and to get two or more fractions enriched by the respective components, the process comprising the steps of:

(i) supplying the feedstock fluid into the packed bed at its upstream end while withdrawing a fraction enriched in a first component from the downstream end of the bed, (ii) supplying a desorbent fluid into the packed bed at its upstream end while withdrawing a fraction enriched in a second component from the downstream end of the bed, and (iii) circulating the fluid in the packed bed from the downstream end of the bed through the piping to its upstream end without supplying or withdrawing any fluid into or from the packed bed, thereby making a mixed zone where the first component withdrawn in step (i) and the second component are present in admixture move to the upstream end of the packed bed, the steps (i) to (iii) being performed cyclically and repeatedly, wherein the packed bed comprises a first unit bed packed with an ion-exchange resin as an adsorbent, to which the feedstock fluid is supplied, and at least one other unit bed packed with an ion-exchange resin as an adsorbent, and the ion-exchange resin packed into the first unit bed, to which the feedstock fluid is supplied, has a higher degree of crosslinking than that in the at least one other unit packed bed.

10. A chromatographic separation process as claimed in claim 9, wherein the absorbent packed in the first unit packed bed and the at least one other unit packed bed is a cation-exchange resin, the average particle size of the cation-exchange resin packed in the first unit bed, to which the feedstock fluid is supplied, is 1.2 to 2.0 times greater than that in the at least one other unit bed, and the degree of crosslinking of the cation-exchang resin packed in the first unit bed, to which the feedstock fluid is supplied, is higher than that in the at least one other unit bed.

11. A chromatographic separation process as claimed in claim 9, wherein the feedstock fluid is a mixture of at least two selected from the group consisting of sugars and sugar alcohols.

12. The chromatographic separation process according to claim 9, which is used for separating into two fractions.

13. The chromatographic separation process according to claim 9, which is used for separating into three fractions.

14. The chromatographic separation process according to claim 9, which is used for separating into four fractions.

15. A chromatographic separation process of a type wherein a feedstock fluid containing a plurality of components having different degrees of affinity for an adsorbent are supplied into a chromatographic separation system, in which the downstream end of a bed packed with the adsorbent is connected to its upstream end by a piping to enable the fluid to flow circulatively from the upstream end of the packed bed to its downstream end to form adsorption zones having concentration distributions of the respective components in the packed bed and then to get two or more fractions enriched by the respective components, the process comprising the steps of:

(i) supplying the feedstock fluid into the packed bed at its upstream end while withdrawing a fraction enriched in a first component from the downstream end of the bed, (ii) supplying a desorbent fluid into the packed bed at its upstream end while withdrawing a fraction enriched in a second component from the downstream end of the bed, and (iii) circulating the fluid in the packed bed from the downstream end of the bed through the piping to its upstream end without supplying or withdrawing any fluid into or from the packed bed, thereby making a mixed zone where the first component withdrawn in step (i) and the second component are present in admixture move to the upstream end of the packed bed, the steps (i) to (iii) being performed cyclically and repeatedly, wherein the packed bed comprises a first unit bed packed with an ion-exchange resin as an adsorbent, to which the feedstock fluid is supplied, and at least one other unit bed packed with an ion-exchange resin as an adsorbent, the ion-exchange resin packed into the first unit bed, to which the feedstock fluid is supplied, has a greater average particle size and/or a higher degree of crosslinking than that in the at least one other unit packed bed, and the volume of the ion-exchange resin in the first unit bed, to which the feedstock fluid is supplied, is ⅛ to ½ of the total volume of the ion-exchange resins of all of the packed unit beds.

16. A chromatographic separation process as claimed in claim 15, wherein the absorbent packed in the first unit packed bed and the at least one other unit packed bed is a cation-exchange resin, the average particle size of the cation-exchange resin packed in the first unit bed, to which the feedstock fluid is supplied, is 1.2 to 2.0 times greater than that in the at least one other unit bed, and the degree of crosslinking of the cation-exchang resin packed in the first unit bed, to which the feedstock fluid is supplied, is higher than that in the at least one other unit bed.

17. A chromatographic separation process as claimed in claim 15, wherein the feedstock fluid is a mixture of at least two selected from the group consisting of sugars and sugar alcohols.

18. The chromatographic separation process according to claim 15, which is used for separating into two fractions.

19. The chromatographic separation process according to claim 15, which is used for separating into three fractions.

20. The chromatographic separation process according to claim 15, which is used for separating into four fractions.

* * * * *